United States Patent [19]
Shibahata

[11] Patent Number: 5,417,298
[45] Date of Patent: May 23, 1995

[54] TORQUE DISTRIBUTION CONTROL APPARATUS FOR VEHICLE

[75] Inventor: Yasuji Shibahata, Wako, Japan

[73] Assignee: Honda Giken Kohyo Kabushiki Kaisha, Tokyo, Japan

[21] Appl. No.: 267,913

[22] Filed: Jul. 6, 1994

[30] Foreign Application Priority Data

Jul. 7, 1993 [JP] Japan .................. 5-167950
Jul. 7, 1993 [JP] Japan .................. 5-167952

[51] Int. Cl.$^6$ .................. B60K 17/348; B60K 23/04
[52] U.S. Cl. .................. 180/76; 74/665 T; 180/79.1; 180/233; 180/247; 180/248; 180/249
[58] Field of Search .................. 180/76, 233, 247, 248, 180/79.1, 242, 243, 249; 74/665 T, 665 F

[56] References Cited

U.S. PATENT DOCUMENTS

| | | | |
|---|---|---|---|
| 4,681,180 | 7/1987 | Oyama et al. | 180/76 |
| 5,119,900 | 6/1992 | Watanabe et al. | 180/247 |
| 5,135,071 | 8/1992 | Shibahata et al. | 180/248 |
| 5,184,695 | 2/1993 | Matsuda et al. | 180/248 |
| 5,279,384 | 1/1994 | Shibahata et al. | 180/248 |
| 5,353,889 | 10/1994 | Hamada | 180/76 |

*Primary Examiner*—Mitchell J. Hill
*Attorney, Agent, or Firm*—Armstrong, Westerman, Hattori, McLeland & Naughton

[57] ABSTRACT

In a vehicle including a torque distributing device for distributing the torque of an engine to left and right driving wheels, a feed-forward control system determines a lateral distribution torque $T_1$ from an engine torque $T_E$, a number Ne of revolutions of the engine, a vehicle speed V and a steering angle $\theta$, and a feed-back control system determines a feed-back torque $T_F$ from a target yaw rate Y determined from the vehicle speed V and the steering angle $\theta$ and an actual yaw rate Yaw. A final distribution torque T is determined by adding the lateral distribution torque $T_1$ and the feed-back torque $T_D$ at a predetermined ratio, and an actuator is driven to distribute the engine torque to the left and right driving wheels on the basis of the final distribution torque T. Thus, it is possible to appropriately distribute the engine torque to the left and right driving wheels, and to allow the actual yaw rate of the vehicle to be matched with the target yaw rate to improve the steering characteristic.

3 Claims, 14 Drawing Sheets

FIG.9

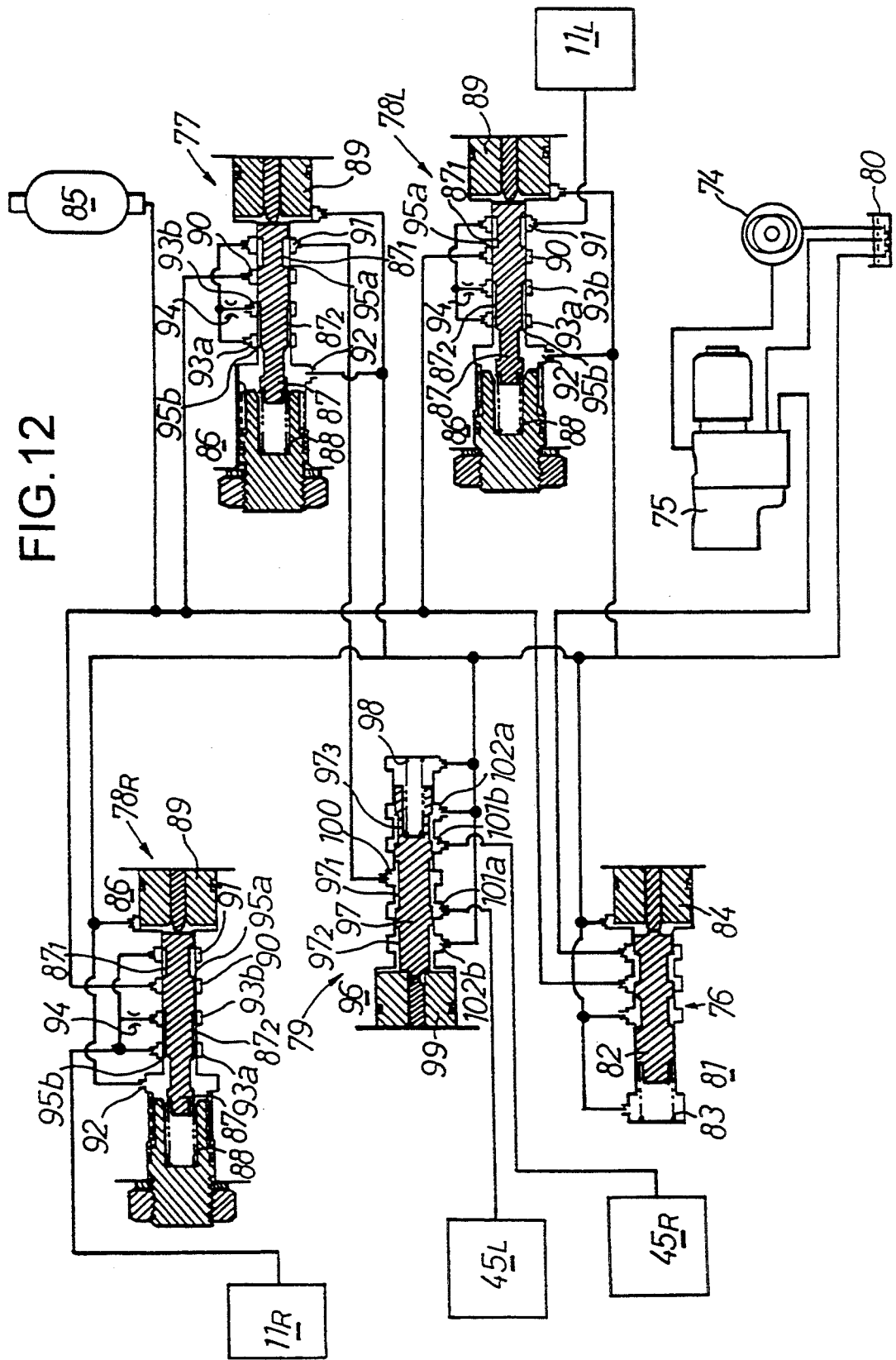

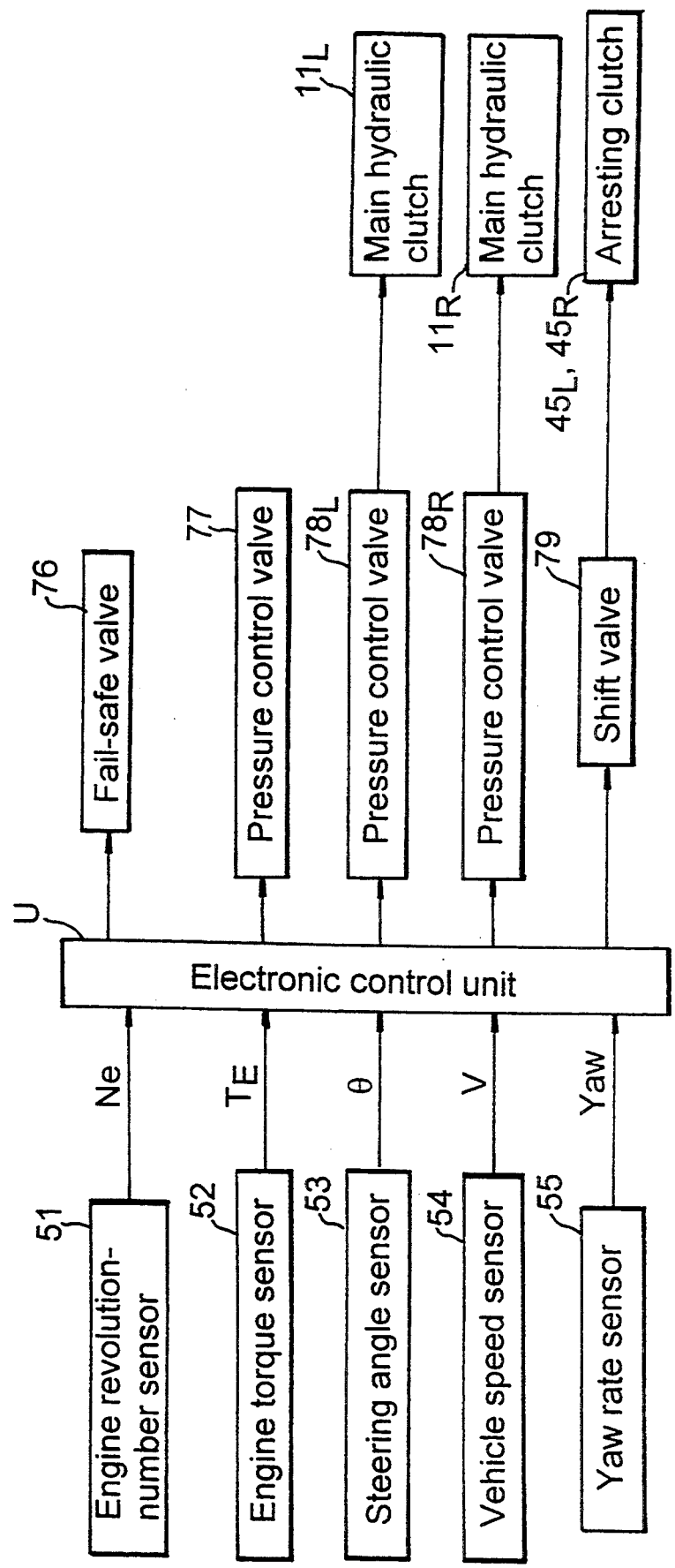

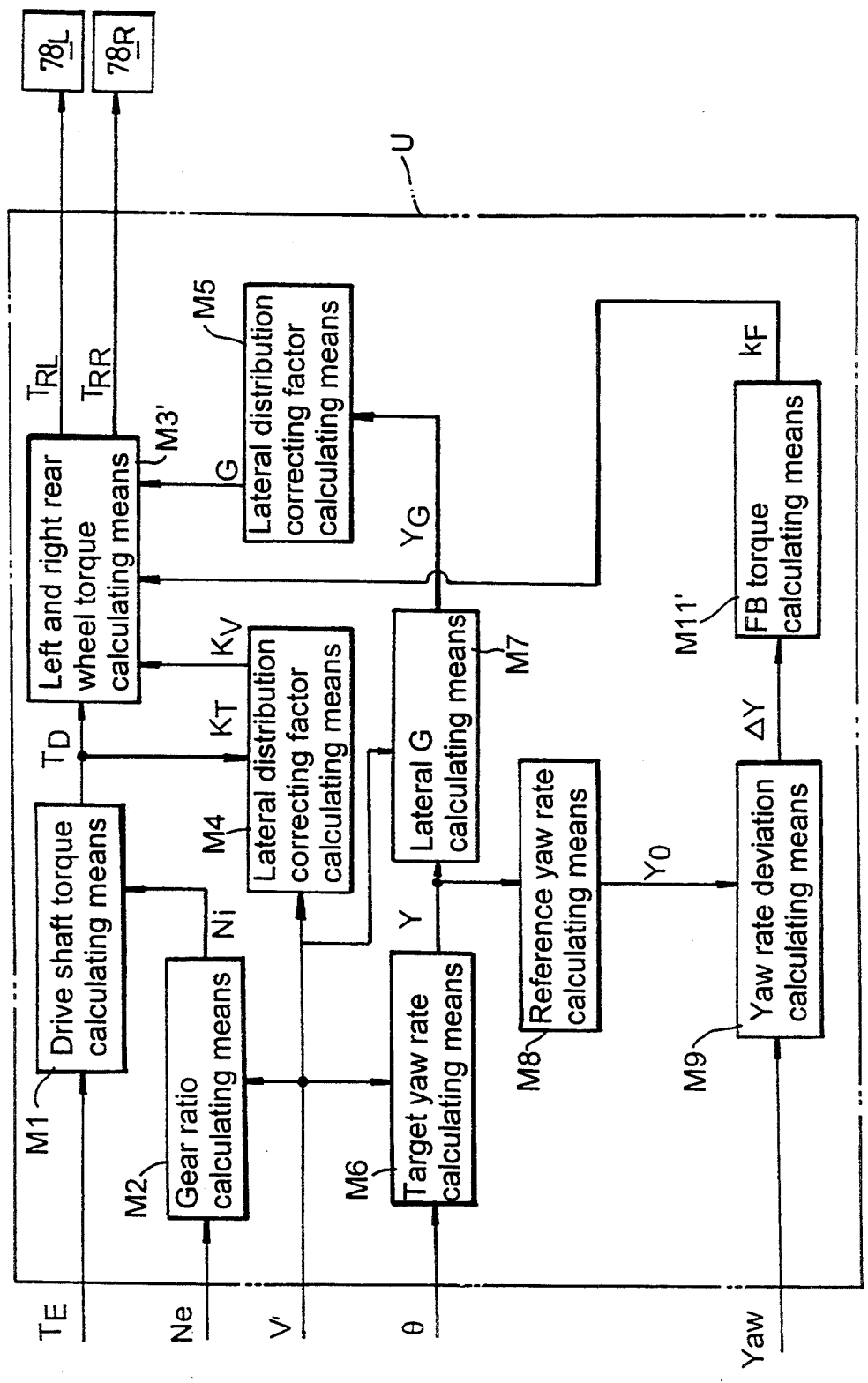

TORQUE DISTRIBUTION CONTROL APPARATUS FOR VEHICLE

BACKGROUND OF THE INVENTION

1. Field of the Invention

The present invention relates to a torque distribution control apparatus for a vehicle, for controlling the torque distribution ratio between two left and right driving wheels, or the torque distribution ratio between four front, rear, left and right driving wheels.

2. Description of the Prior Art

A differential mounted in a power transmitting system of a vehicle is constructed to absorb a difference in rotational speed produced between the left and right wheels during turning of the vehicle and distribute the torque of an engine at an appropriate ratio to the left and right wheels. However, a common differential is accompanied by a problem that it is operated by a difference between loads applied to the left and right wheels and hence, when one of the wheels has run onto a road surface having a small friction coefficient, so that it has been raced, the amount of torque transmitted to the other wheel is decreased, or the transmission of the torque is blocked.

In order to avoid such disadvantage, a torque distribution control apparatus has been proposed in Japanese Patent Application Laid-open No. 94421/87, in which a hydraulic clutch is disposed in each of power transmitting systems connected to the left and right driving wheels, so that a torque suitable for a now operational condition is distributed to the left and right driving wheels to improve the turning performance by independently adjusting the engagement forces of the pair of hydraulic clutches on the basis of a steering angle and a vehicle speed.

A torque distribution control apparatus is also known from Japanese Patent Application Laid-open No. 525/91, which controls the torque distribution to distribute the torque of an engine to front driving wheels and rear driving wheels at a predetermined longitudinal torque distribution ratio, and controls the torque distribution to distribute at least one of the torque distributed to the front driving wheels and the torque distributed to the rear driving wheels to the left driving wheels and the right driving wheels at a predetermined lateral torque distribution ratio. This torque distribution control apparatus maintains constant the longitudinal torque distribution ratio between the front driving wheels and the rear driving wheels, or performs a feed-forward control thereof in accordance with the torque of the engine, and performs a feed-back control of the lateral torque distribution ratio between left rear driving wheel and the right rear driving wheel in accordance with a vehicle speed and/or a lateral acceleration, thereby enhancing the turning performance of the vehicle.

In any of the above prior art control apparatus, however, the torque distribution ratio is only feed-forward controlled on the basis of the traveling condition of the vehicle and therefore, a control of a high accuracy is difficult, and it is necessarily not possible to match the actual turning condition of the vehicle with a turning condition desired by a driver.

SUMMARY OF THE INVENTION

Accordingly, it is an object of the present invention to provide a torque distribution control apparatus for a vehicle, which is excellent in responsiveness and convergeability and which enables the actual turning condition of the vehicle to be appropriately matched with a turning condition desired by a driver.

To achieve the above object, according to the present invention, there is provided a torque distribution control apparatus for a vehicle for controlling the torque distribution to distribute the torque of an engine to left and right driving wheels at a predetermined torque distribution ratio, comprising a travel condition detecting means for detecting the travel condition of the vehicle, an attitude change amount detecting means for detecting the change amount of attitude of the vehicle, a control means for feed-forward controlling the torque distribution ratio on the basis of an output from the travel condition detecting means, and feed-back controlling the torque distribution ratio, so that an actual attitude change amount determined on the basis of an output from the attitude change amount detecting means is matched with a target attitude change amount determined on the basis of the output from the travel condition detecting means, and an actuator for allowing the torque distribution on the basis of an output from the control means.

With the above arrangement, a feed-forward control system and a feed-back control system are juxtaposed to allow the actual attitude change amount of the vehicle to be matched with a target attitude change amount of the vehicle which a driver desires to achieve. Therefore, it is possible to reconcile a high responsiveness by the feed-forward control system and a high convergeability by the feed-back control system to provide an excellent steering characteristic.

In addition, according to the present invention, there is provided a torque distribution control apparatus for a vehicle for controlling the torque distribution to distribute the torque of an engine to front driving wheels and rear driving wheels at a predetermined longitudinal torque distribution ratio, and controlling the torque distribution to distribute at least one of the torque distributed to the front driving wheels and the torque distributed to the rear driving wheels to the left driving wheels and the right driving wheels at a predetermined lateral torque distribution ratio, comprising a travel condition detecting means for detecting the travel condition of the vehicle, an attitude change amount detecting means for detecting the change amount of attitude of the vehicle, a control means for feed-forward controlling the lateral torque distribution ratio on the basis of an output from the travel condition detecting means, and feed-back controlling the longitudinal torque distribution ratio, so that an actual attitude change amount determined on the basis of an output from the attitude change amount detecting means is matched with a target attitude change amount determined on the basis of the output from the travel condition detecting means, and an actuator for allowing the torque distribution on the basis of an output from the control means.

With the above arrangement, the longitudinal torque distribution ratio between the front driving wheels and the rear driving wheels is feed-back controlled, and the lateral torque distribution ratio between the left and right driving wheels is feed-forward controlled, in order to allow the actual attitude change amount to be matched with the target attitude change amount of the vehicle desired by the driver. Therefore, it is possible to reconcile a high convergeability by the feed-back control system and a high responsiveness by the feed-forward control system to provide an excellent steering characteristic.

The travel condition detecting means delivering the output used for determining the target attitude change amount may be comprised of an engine torque sensor for detecting a torque of the engine, a vehicle speed sensor for detecting a vehicle speed, and a steering angle sensor for detecting a steering angle, and the attitude change amount detecting means for determining the actual attitude change amount may be comprised of a yaw rate sensor for detecting a yaw rate. Thus, it is possible to properly determine the two attitude change amounts.

The above and other objects, features and advantages of the invention will become apparent from the following description of preferred embodiments taken in conjunction with the accompanying drawings.

BRIEF DESCRIPTION OF THE DRAWINGS

FIGS. 1 to 8 illustrate a first embodiment of the present invention, wherein

FIG. 1 is an illustration of a torque distribution control apparatus according to the first embodiment;

FIG. 2 is a diagram illustrating a hydraulic circuit in the first embodiment;

FIG. 3 is a block diagram illustrating a circuit arrangement of an electronic control unit;

FIG. 6 is a diagram illustrating a map for determining a lateral distribution correcting factor G;

FIG. 8 is a diagram illustrating a map for determining a torque decrement $\Delta T_E$;

FIGS. 9 and 10 illustrate a second embodiment of the present invention, wherein

FIG. 9 is an illustration of a torque distribution control apparatus according to the second embodiment;

FIG. 10 is a diagram illustrating a hydraulic circuit in the second embodiment; and FIGS. 11 to 14 illustrate a third embodiment of the present invention, wherein FIG. 11 is an illustration of a torque distribution control apparatus according to the third embodiment;

FIG. 12 is a diagram illustrating a hydraulic circuit in the third embodiment;

FIG. 13 is a block diagram of a control system;

FIG. 14 is a block diagram illustrating a circuit arrangement of an electronic control unit.

DESCRIPTION OF THE PREFERRED EMBODIMENTS

A first embodiment of the present invention will now be described in connection with FIGS. 1 to 8.

Figure 1:
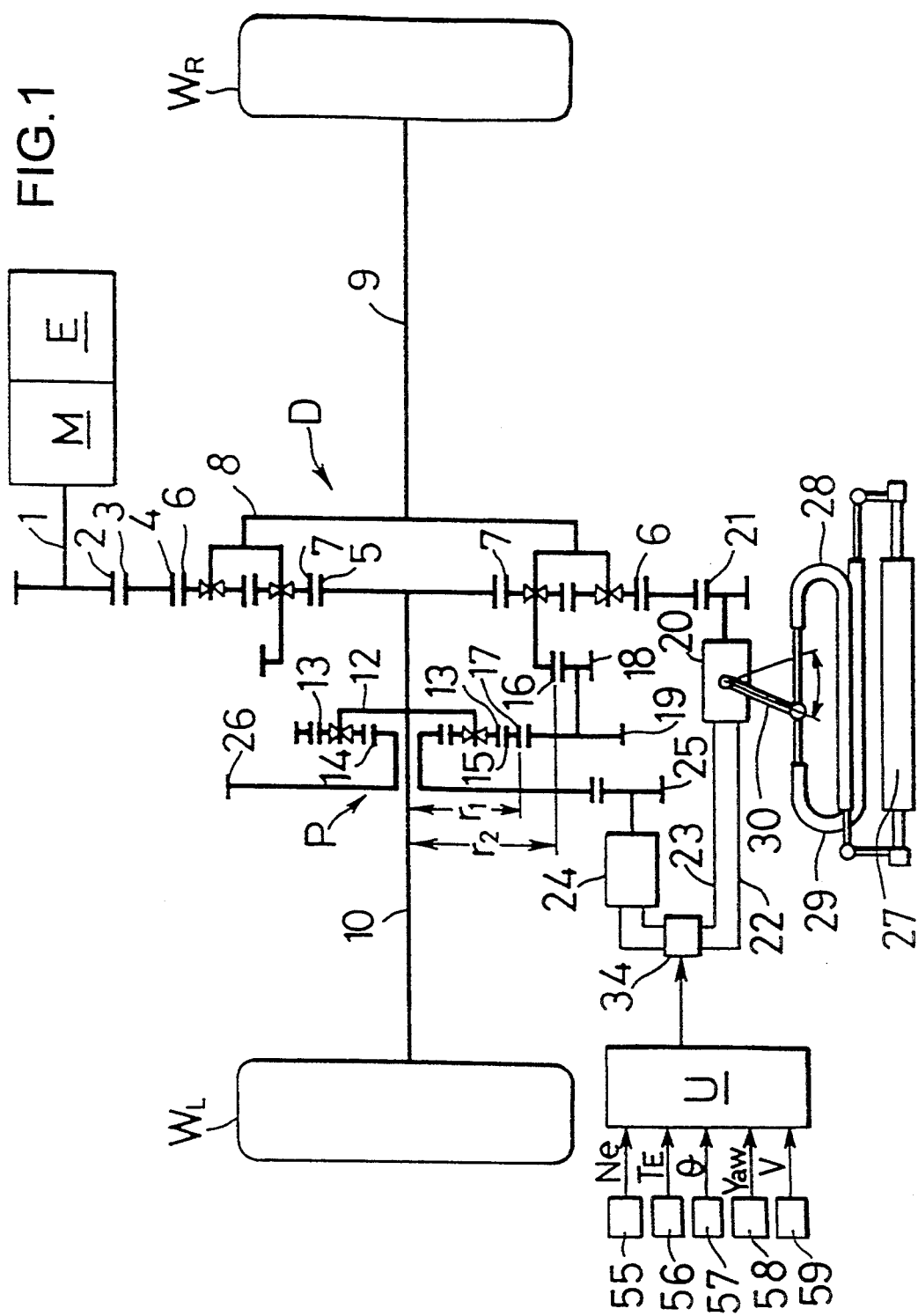

A torque distribution control apparatus of the first embodiment is applied to a front engine and front drive vehicle. As shown in FIG. 1, a transmission M is connected to an engine E horizontally mounted in a vehicle body. A differential input shaft 1 which is an output shaft of the transmission M includes an input gear 2 for transmitting a driving force to a planetary type main differential D.

The main differential D is composed of a ring gear 4 provided around its outer periphery with an external-tooth gear 3 meshed with the input gear 2 on the differential input shaft 1, a sun gear 5 coaxially disposed within the ring gear 4, and a planetary carrier 8 which carries an outer planetary gear 6 meshed with the ring gear 4 and an inner planetary gear 7 meshed with the sun gear 5 in a meshed relation to each other. In the differential D, the ring gear 4 functions as an input element, and the planetary carrier 8 functioning as one of output elements is connected to a right wheel $W_R$ through a right shaft 9. The sun gear 5 functioning as the other output element is connected to a left wheel $W_L$ through a left shaft 10.

The following is the description of the structure of a planetary gearing P for distributing a torque received from the ring gear 4 as the input element of the main differential D to the planetary carrier 8 and the sun gear 5 in a predetermined ratio.

In the planetary gearing P, a planetary gear 13 provided on a planetary carrier 12 coupled to the left shaft 10 is meshed with a sun gear 14 relatively rotatably carried on the left shaft 10, and is also meshed with a ring gear 16 disposed around an outer periphery of the planetary carrier 12. An external-tooth gear 16 formed integrally with the planetary carrier 8 of the main differential D and an external-tooth gear 17 formed on the ring gear 15 of the planetary gearing P are meshed with a pair of integrally formed pinions 18 and 19, respectively. Thus, the main differential D and the planetary gearing P are connected to each other.

If the numbers of teeth of the planetary gear 13, the sun gear 14 and the ring gear 15 of the planetary gearing P are represented by $Z_P$, $Z_S$ and $Z_R$, respectively, and the speeds of rotations of the planetary carrier 12, the sun gear 14 and the ring gear 15 are represented by $\omega_C$, $\omega_S$ and $\omega_R$, respectively, a following expression (1) is established as well known, when the sun gear 14 is fixed:

$$\omega_R = \omega_C \times (1 + Z_S/Z_R) \tag{1}$$

Here suppose that the right and left wheels $W_R$ and $W_L$ are rotated at the same speed. In this case, the speed of rotation of the planetary carrier 12 of the planetary gearing P rotated in unison with the left wheel $W_L$ is $\omega_C$, and the speed of rotation of the planetary carrier 8 of the main differential D rotated in unison with the right wheel $W_R$, which is the same speed as the left wheel $W_L$, is also $\omega_C$. The speed $\omega_R$ of rotation of the ring gear 15 driven by the planetary carrier 12 of the planetary gearing P is represented by the above expression (1), $\omega_C \times (1 + Z_S/Z_R)$.

In other words, in order to ensure that the right and left wheels $W_R$ and $W_L$ are rotated at the same speed $\omega_C$, it is necessary to connect the planetary carrier 8 and the ring gear 15 in an operatively associated relation to each other by the pair of pinions 18 and 19, such that the speed of rotation of the planetary carrier 8 of the main differential D is equal to $\omega_C$, and the speed of rotation of the ring gear 15 of the planetary gearing P is equal to $\omega_C \times (1 + Z_S/R)$. For this purpose, the radius $r_1$ of the external-tooth gear 17 formed on the ring gear 15 and the radius $r=2$ of the external-tooth gear 16 formed on the planetary carrier 8 may be set to satisfy a following relation:

$$r_2/r_1 + 1 + (Z_S/Z_R) \tag{2}$$

A well-known axial piston type variable displacement hydraulic pump 20 is connected to and driven by a pinion 21 meshed with the external-tooth gear 3 formed integrally with the ring gear 4. The hydraulic pump 20 is connected to a hydraulic motor 24 through oil passages 22 and 23. A pinion 25 is provided on an output shaft of the hydraulic motor 24 and meshed with a planetary gearing input gear 26 formed integrally with the sun gear 14 of the planetary gearing P.

A steering gear 27 is in operative association with the operation of a steering wheel and is movable laterally of the vehicle body. Opposite ends the of the gear 27 is connected to a displacement adjusting lever 30 for driving a swash plate of the hydraulic pump 20 through a pair of Bowden wires 28 and 29. Thus, when the steering wheel is in its neutral position, the amount of oil discharged from the hydraulic pump 20 is equal to 0 (zero). When the steering wheel is steered in one direction, an amount of pressure oil corresponding to a steering angle of the steering wheel and a now number of rotations of the pinion (i.e., a vehicle speed) is discharged from the hydraulic pump 20 into the oil passage 22. When the steering wheel is steered in the other direction, an amount of pressure oil corresponding to a steering angle of the steering wheel and a now vehicle speed is discharged from the hydraulic pump 20 into the oil passage 23.

Figure 2:
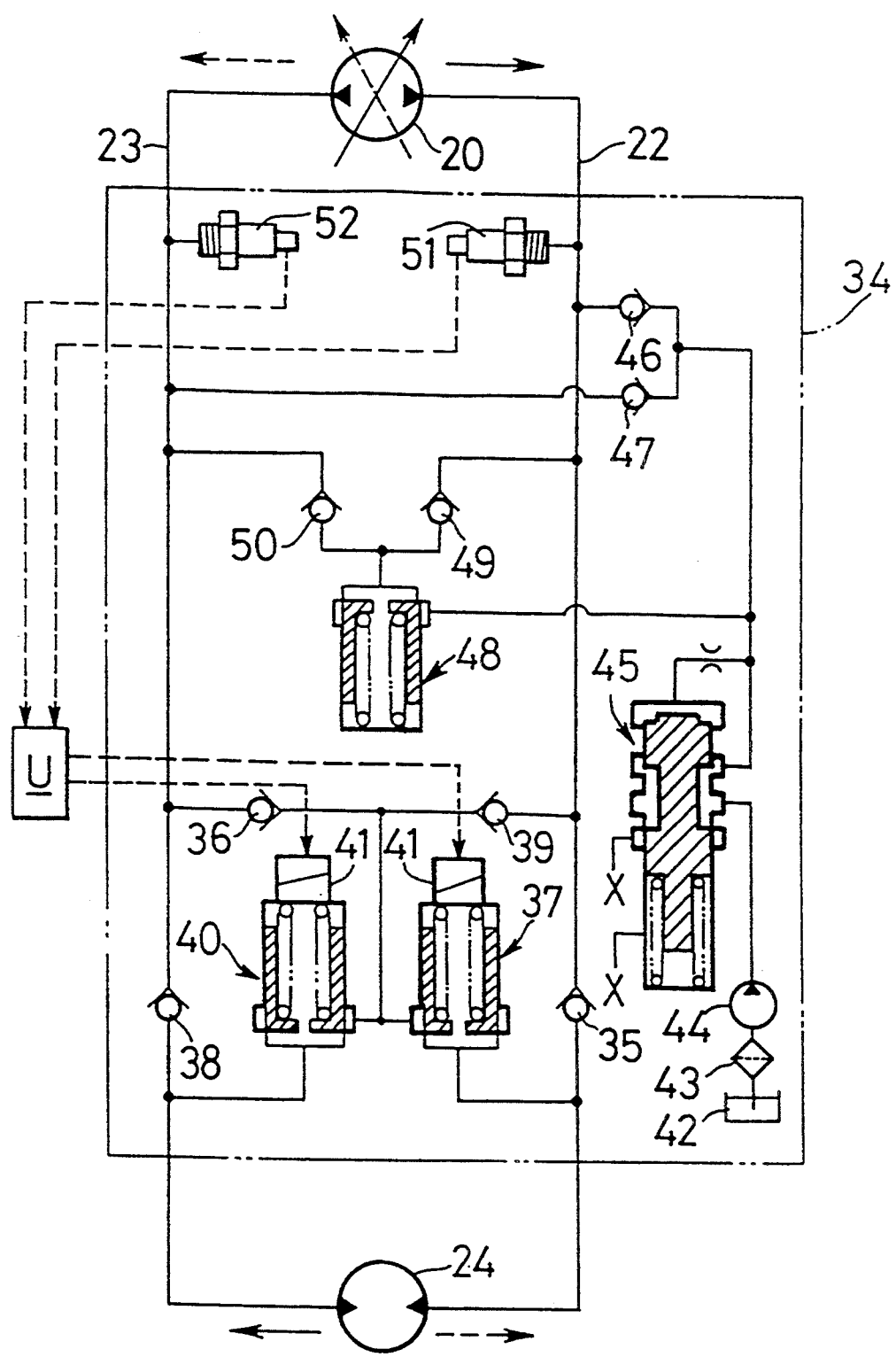

As can be seen from FIG. 2, a hydraulic pressure control means 34 connected to an electronic control unit U includes a relief valve 37 for permitting a hydraulic pressure in the oil passage 22 to be escaped into the oil passage 23 through a pair of check valves 35 and 36, and a relief valve 40 for permitting a hydraulic pressure in the oil passage 23 to be escaped into the oil passage 22 through a pair of check valves 38 and 39. A pair of the check valves 37 and 40 are arranged so that a relief pressure can be adjusted by linear solenoids 41, 41 which is connected to and controlled by the electronic control unit U.

A strainer 43, a charge pump 44, a pressure control valve 45 and a pair of check valves 46 and 47 are disposed between the an oil tank 42 and the oil passages 22 and 23. A relief valve 48 and a pair of check valves 49 and 50 are disposed between the pressure control valve 45 and the oil passages 22 and 23. If the hydraulic pressure in one of the oil passages 22 and 23 exceeds a relief pressure of the relief valve 48, it is escaped through the check valve 46 or 47 into the other oil passage 22 or 23. An amount of oil corresponding to the amount of oil escaped from the oil passage 22 or 23 is supplemented from the charge pump 44 through the pressure control valve 45 and the check valve 46 or 47 into the oil passage 22 or 23.

Hydraulic pressure sensors 51 and 52 are provided in the oil passages 22 and 23, respectively and connected to the electronic control unit U. The hydraulic pressure in the oil passages 22 and 23 can be controlled by the adjusting the relief pressures of the relief valves 37 and 40 on the basis of outputs from the hydraulic pressure sensors 51 and 52, thereby converging the number of revolutions of the hydraulic motor 24 into a target value.

Returning to FIG. 1, connected to the electronic control unit U are an engine revolution-number sensor 55 for detecting the number Ne of revolutions of the engine E, a engine torque sensor 56 for detecting a torque of the engine E, a steering angle sensor 57 for detecting a steering angle $\theta$, a yaw rate sensor 58 for detecting an actual yaw rate YaW of the vehicle, and a vehicle speed sensor 59 for detecting a vehicle speed V. The electronic control unit U calculates a signal from each of the sensors according to a predetermined program to control the hydraulic pressure control means 34.

A circuit arrangement of the electronic control unit U will be described below with reference to FIG. 3.

The electronic control unit U includes a drive shaft torque calculating means M1 for calculating a drive shaft torque $T_D$ (i.e., a sum total of torques transmitted to the right and left shafts 9 and 10). In the drive shaft torque calculating means M1, a drive shaft torque $T_D$ ($=T_E\times Ni$) is determined by multiplying a torque $T_E$ of the engine E by a gear ratio Ni determined from a number Ne of revolutions of the engine and a vehicle speed V. It should be appreciated that the engine torque $T_E$ can be determined from an intake pressure (or an opening degree of an accelerator) and the number Ne of revolutions of the engine, and the drive shaft torque $T_D$ can be the engine, and the drive shaft torque $T_D$ can be determined either by a torque sensor provided in a power transmitting system in addition to the above-described sensors, or from a longitudinal acceleration of the vehicle. In addition, the vehicle speed may be optically determined using a spatial filter in addition to the determination from a follower wheel speed, or may be determined using Doppler radar.

If the drive shaft torque $T_D$ is determined, a lateral distribution torque $T_1$ ($=T_D\times K_W\times K_V\times K_T\times G$) to be generated in the hydraulic motor 24 is determined by multiplying, in a lateral distribution torque calculating means M3, the drive shaft torque $T_D$ by a constant $K_W$, lateral distribution correcting factors $K_T$ and $K_V$ determined in a lateral distribution correcting factor calculating means M4, and a lateral distribution correcting factor G determined in a lateral distribution correcting factor calculating means M5. The lateral distribution torque $T_1$ is determined to distribute the drive shaft torque $T_D$ at a predetermined ratio to the left and right wheels $W_L$ and $W_R$. For example, if a torque equal to $T_D/2+T_1$ is distributed to the left wheel $W_L$, a torque equal to $T_D/2-T_1$ is distributed to the right wheel $W_R$.

Figure 4A:
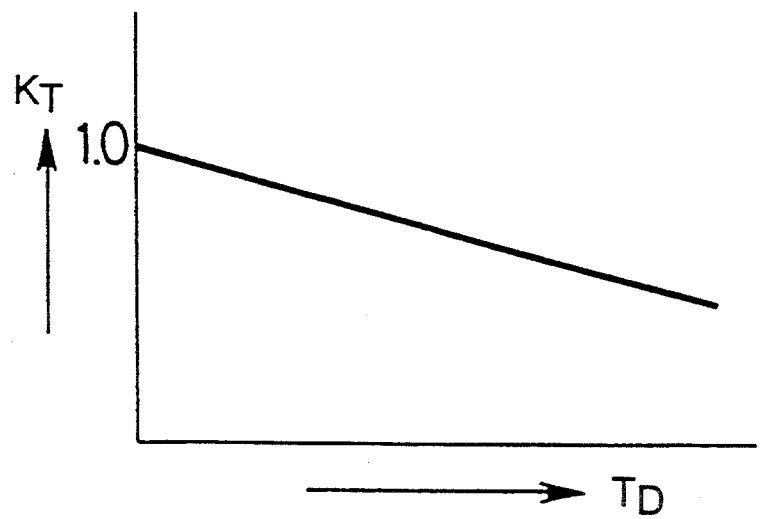
FIGS. 4A and 4B are diagrams illustrating a map for determining lateral distribution correcting factors $K_T$ and $K_V$.
Figure 4B:
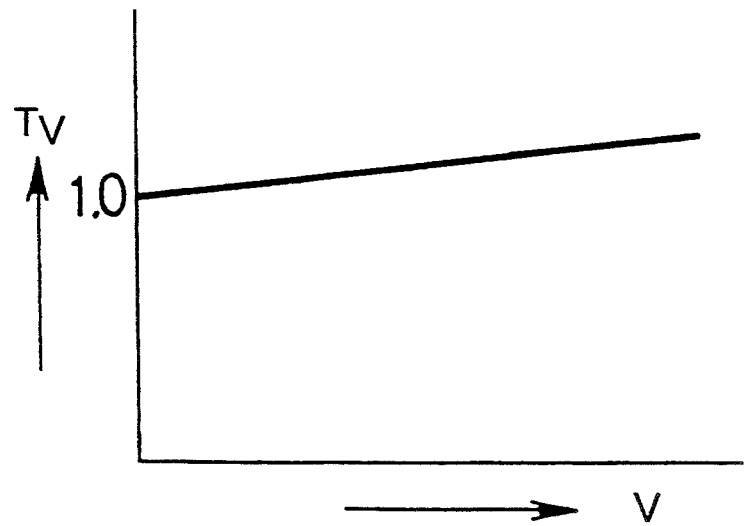
Figure 5A:
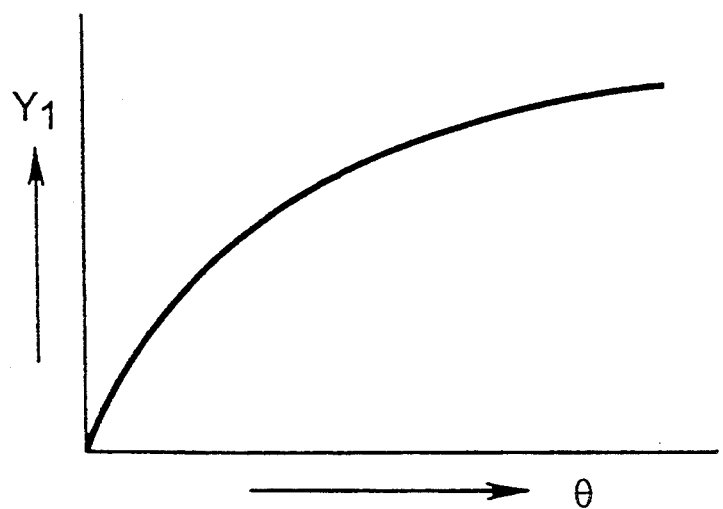
FIGS. 5A and 5B are diagrams illustrating a map for determining a target yaw rate Y.
Figure 5B:
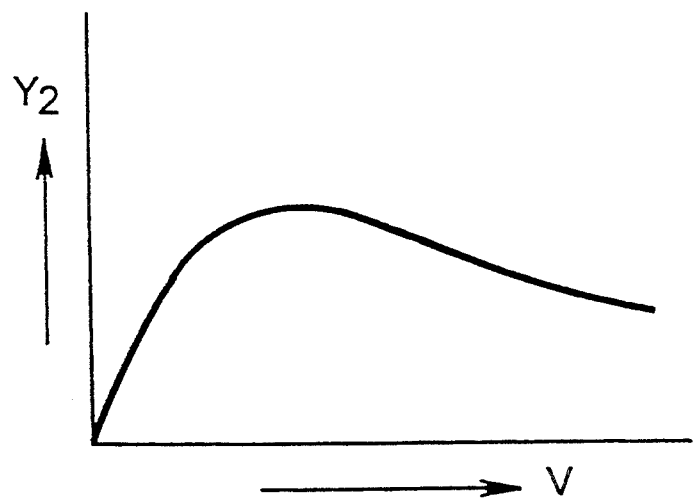
Figure 6:
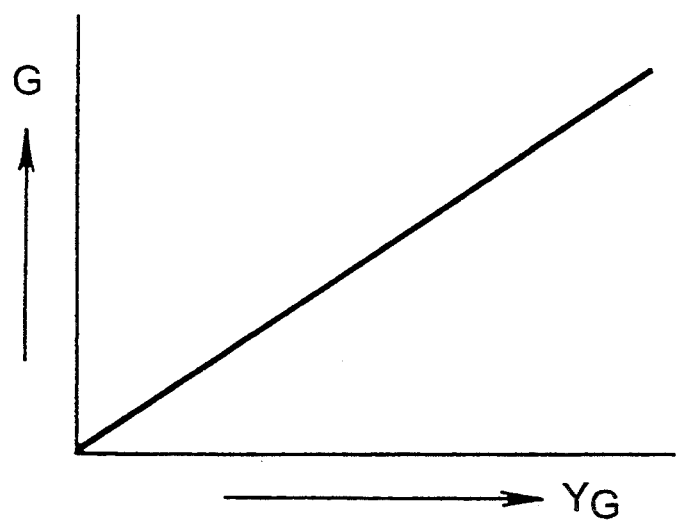

The lateral distribution correcting factors $K_T$, $K_V$ and G used in the calculation in the lateral distribution torque calculating means M3 are determined in the following manner:

First, in the lateral distribution correcting factor calculating means M4, a lateral distribution correcting factor $K_T$ relative to the drive shaft torque $T_D$ is searched from a map shown in FIG. 4A on the basis of the drive shaft torque $T_D$, and a lateral distribution correcting factor $K_V$ relative to the vehicle speed V is searched from a map shown in FIG. 4B on the basis of the vehicle speed V. Then, in a target yaw rate calculating means M6, a steering angle component $Y_1$ of a target yaw rate Y is searched from a map shown in FIG. 5A on the basis of the steering angle $\theta$, and a vehicle speed component $Y_2$ of the target yaw rate Y is searched from a map shown in FIG. 5B on the basis of the vehicle speed V. A target yaw rate Y ($=Y_1\times Y_2$) is determined by multiplying the searched steering angle component $Y_1$ and vehicle speed component $Y_2$ by each other. Subsequently, a lateral acceleration $Y_G$ ($=Y\times V$) is determined by multiplying the target yaw rate by the vehicle speed V in a lateral acceleration calculating means M7, and a lateral distribution correcting factor G is determined in the lateral distribution correcting factor calculating means M5 on the basis of the lateral acceleration $Y_G$ from a map shown in FIG. 6.

The means M1 to M7 constitute a feed-forward control system, where a lateral distribution torque $T_1$ to be generated by the hydraulic motor 24 to provide a turning state desired by a driver is evaluated on the parameters $T_E$, Ne, V and $\theta$ representing an operational condition of the vehicle.

The torque distribution control means of the electronic control unit U further includes feed-back control system M8 to M12 in addition to the feed-forward control system M1 to M7.

In a reference yaw rate calculating means M8 of the feed-back control system, a reference yaw rate $Y_O$, i.e., a yaw rate intended to be provided by operating of the steering wheel by the driver, is determined by filtering the target yaw rate Y. Y yaw rate deviation $\Delta Y$ (=Yaw$-Y_O$) is determined in a yaw rate deviation calculating means M9 by comparison of the reference yaw rate $Y_O$ with an actual yaw rate Yaw. The actual yaw rate Yaw can be determined by subtraction of a difference in speed between the follower wheels or between the left and right driving wheels by a tread of the vehicle, in addition to the determination by any of various gyros.

Figure 7A:
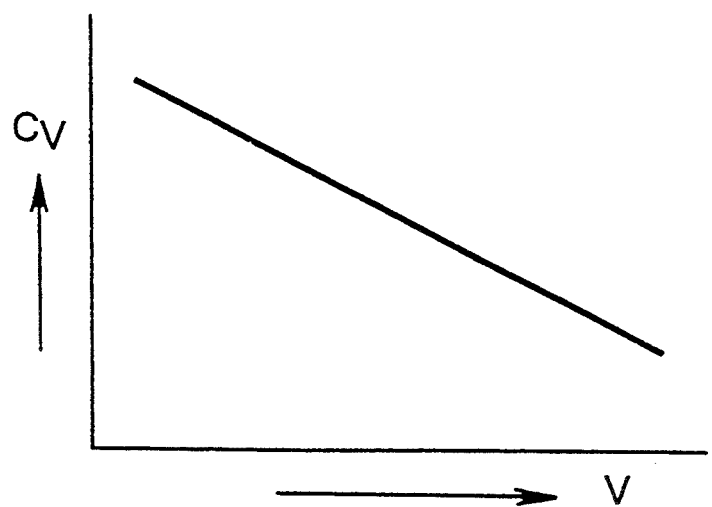
FIGS. 7A and 7B are diagrams Δ illustrating a map for determining feed-back correcting factors $C_V$ and $C_G$.
Figure 7B:
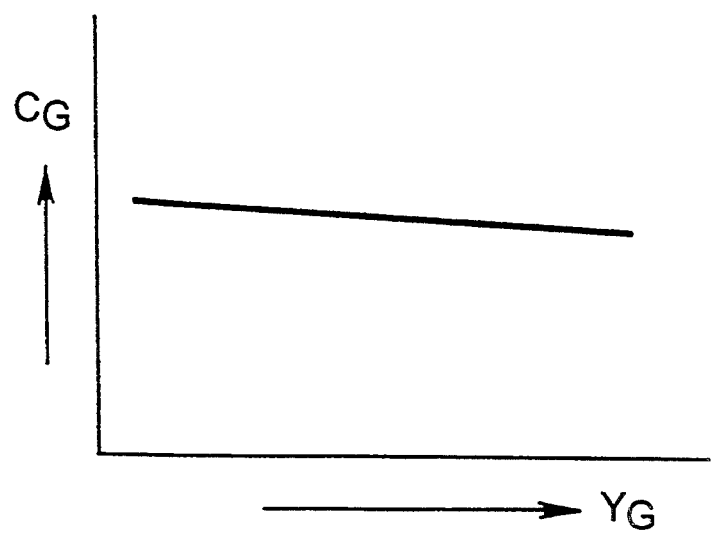
Figure 8:
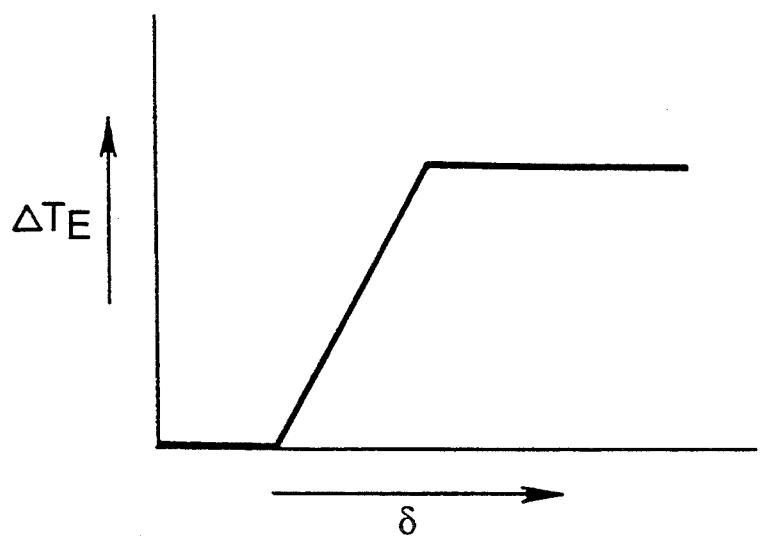

On the other hand, in a feed-back correcting factor calculating means M10, a feed-back correcting factor $C_V$ relative to the vehicle speed V is searched from a map shown in FIG. 7A on the basis of the vehicle speed V, and a feed-back correcting factor $C_G$ relative to the lateral acceleration $Y_G$ is searched from a map shown in FIG. 7B on the basis of the lateral acceleration $Y_G$. In a feed-back torque calculating means M11, a feed-back torque $T_F$ (=$\Delta Y \times C_W \times C_V \times C_G$) is determined by multiplying the yaw rate deviation $\Delta Y$ by a constant $C_W$ and feed-back correcting factors $C_V$ and $C_G$ determined in the feed-back correcting factor calculating means M10.

Then, in a feed-back addition torque calculating means M12, a feed-back addition torque $\Delta T_F$ (=$T_F - C \times T_1$) is determined by subtracting a value C-times the lateral distribution torque $T_1$ from the feed-back torque $T_F$ in order to provide a predetermined weighting between the feed-back torque $T_F$ and the lateral distribution torque $T_1$, wherein C is a predetermined weighting factor ($0 \leq C \leq 1$). Then, in a final distribution torque determining means M13, a final distribution torque T to be generated by the hydraulic motor 24 is determined by adding the lateral distribution torque $T_1$ and the feed-back addition torque $\Delta T_F$ to each other.

The final distribution torque T is equal to $T_F + (1-C) T_1$ and hence, equal to $T_F + T_1$, when the weighting factor C is equal to 0 (zero), so that the weights of the feed-back torque $T_F$ and the lateral distribution torque $T_1$ are equal to each other. When C=1, $T=T_F$, so that the maximum weight of the feed-back torque $T_F$ is provided. In this manner, the specific weight of a feed-forward control by the lateral distribution torque $T_1$ and the specific weight of a feed-back control by the feed-back torque $T_F$ can be changed properly by varying the value of the weighting factor C.

The hydraulic pressure control means 34 is controlled, so that the hydraulic motor 24 delivers the final distribution torque T determined in the final distribution torque determining means M13.

The operation of the first embodiment of the present invention having the above-described arrangement will be described below.

During a normal traveling of the vehicle, a torque distribution mode is applied, wherein the torque from the engine E is distributed at a predetermined ratio to the left and right wheels $W_L$ and $W_R$ by generating the final distribution torque T in the hydraulic motor 24 by a command from the electronic control unit U.

For example, during a straight traveling of the vehicle, the amount of oil discharged from the hydraulic pump 20 is equal to 0 (zero) and hence, the hydraulic motor 24 is maintained at its stopped state, and the sun gear 14 of the planetary gearing P connected to the pinion 25 of the hydraulic motor 24 through the planetary gearing input gear 26 is fixed. At this time, the planetary carrier 8 of the main differential D and the planetary carrier 12 of the planetary gearing P have been connected in an operatively associated manner to each other at a predetermined gear ratio through the ring gear 15, the external-tooth gear 17, the pinion 19, the pinion 18 and the external-tooth gear 16, as described above. Therefore, the rotational speeds of the planetary carriers 8 and 12, i.e., the rotational speeds of the planetary carrier 8 and the sun gear 5 which are the pair of output elements of the main differential D, are forcedly equalized to each other, so that the right and left wheels $W_R$ and $W_L$ are rotated at the same speed.

Now, when the steering wheel is operated to turn the vehicle, if a discharging direction of the hydraulic pump 20 is as shown by a solid line in FIG. 2, the relief pressure of the relief valve 37 is adjusted to a predetermined value by the linear solenoid 41, and the relief pressure of the relief valve 40 is reduced by the linear solenoid 41, so that the relief valve 40 is brought into a substantially opened state. As a result, a portion of the oil discharged from the hydraulic pump 20 is supplied through the check valve 35 to the hydraulic motor 24, and the oil used to drive the hydraulic motor 24 is passed through the relief valve 40 and the check valve 36 back to the hydraulic pump 20. The remaining portion of the oil discharged from the hydraulic pump 20 is passed through the check valve 35, the relief valve 37 and the check valve 36 back to the hydraulic pump 20.

On the other hand, if a discharging direction of the hydraulic pump 20 is as shown by a dashed line in FIG. 2, the relief pressure of the relief valve 40 is adjusted to a predetermined value by the linear solenoid 41, and the relief pressure of the relief valve 37 is reduced by the linear solenoid 41, so that the relief valve 37 is brought into a substantially opened state. As a result, a portion of the oil discharged from the hydraulic pump 20 is supplied through the check valve 38 to the hydraulic motor 24, and the oil used to drive the hydraulic motor 24 is passed through the relief valve 37 and the check valve 39 back to the hydraulic pump 20. The remaining portion of the oil discharged from the hydraulic pump 20 is passed through the check valve 38, the relief valve 40 and the check valve 39 back to the hydraulic pump 20.

When the hydraulic motor 24 is rotated in a predetermined rotational direction and at a predetermined rotational speed in the above manner, the sun gear 14 of the planetary gearing P is rotated to produce a predetermined difference between the rotational speeds of the planetary carriers 8 and 12 and thus between the rotational speeds of the planetary carrier 8 and the sun gear 5 of the main differential D. Thus, the torque transmitted from the transmission M to the ring gear 4 of the main differential D is distributed to the left and right wheels $W_L$ and $W_R$ at a predetermined ratio determined by the rotational direction and the rotational speed of the hydraulic motor 24.

Figure 3:
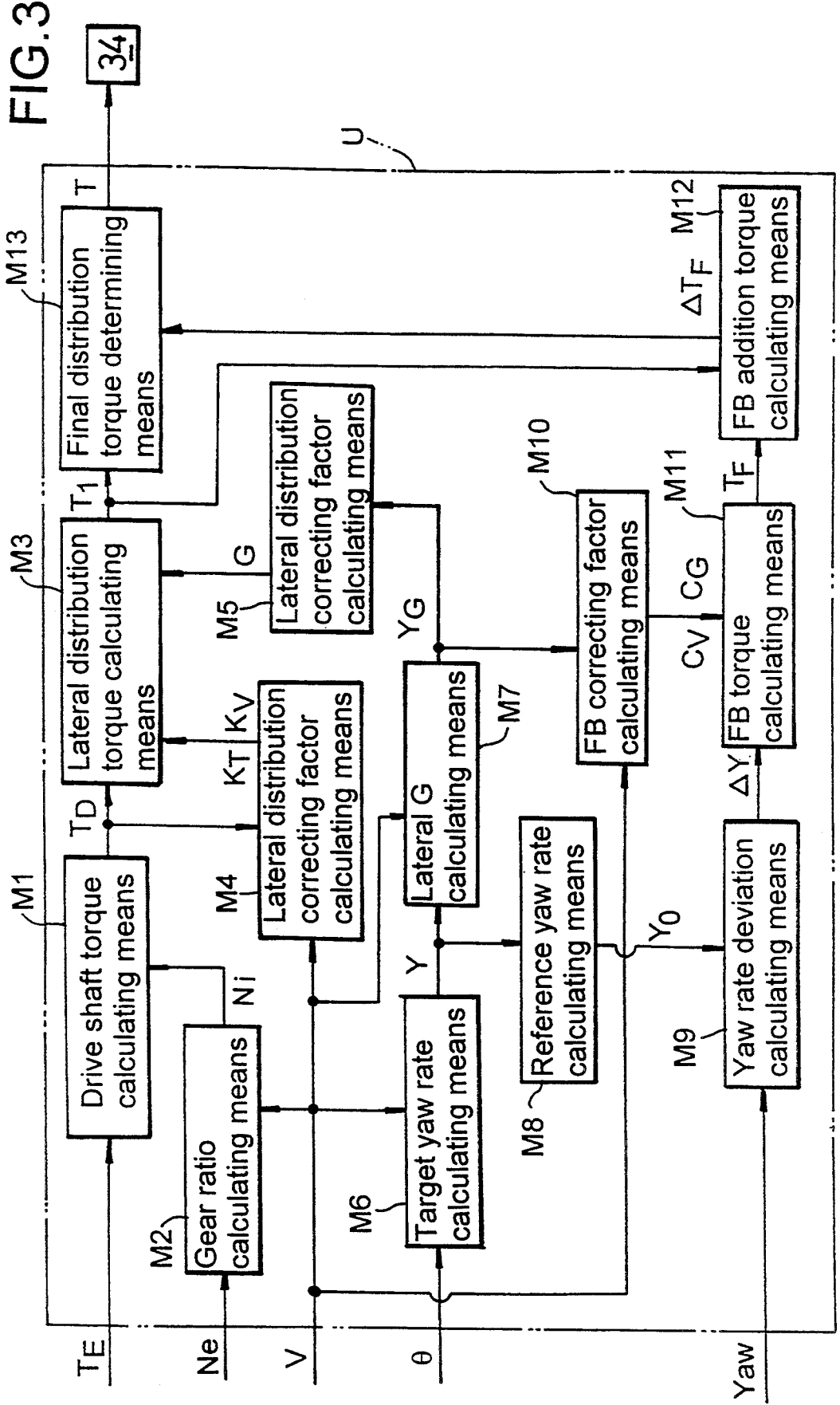

In the torque distribution mode, as described above, the relief pressures of the relief valves 37 and 40 are controlled by the electronic control unit U, so that the torque generated by the hydraulic motor 24 is equal to the final distribution torque T determined in the final distribution torque determining means M13 shown in FIG. 3, and the torque from the engine E is distributed to the left and right wheels $W_L$ and $W_R$ at a ratio corresponding to a now operational condition of the vehicle.

For example, when it has been decided by signals from the engine revolution-number sensor 55, the engine torque sensor 56, the steering angle sensor 57 and the yaw rate sensor 58 that the vehicle has been fallen into a muddy place on a road to produce a slipping of one wheel, or when it has been decided that the vehicle has reached a high speed straight traveling state, a differential-locked mode is applied. If a discharging direction of the hydraulic pump 20 is as shown by the solid line when the differential-locked mode has been selected, the relief pressure of the relief valve 40 is increased, so that the relief valve 40 is brought into a substantially closed state, and the relief pressure of the relief valve 37 is reduced, so that the relief valve 37 is brought into a substantially opened state. As a result, the oil discharged from the hydraulic pump 20 is passed through the check valve 35, the relief valve 37 and the check valve 36 back to the hydraulic pump 20. At this time, the hydraulic motor 24 forcedly rotated by a difference in load between the left and right wheels $W_L$ and $W_R$ is in the discharging direction shown by the solid line, but the oil discharged from the hydraulic motor 24 is blocked by the relief valve 40 and the check valve 38, and the hydraulic motor 24 is locked into a non-rotatable state, thereby realizing a differential-locked state.

On the other hand, if a discharging direction of the hydraulic pump 20 is as shown by the dashed line, the relief pressure of the relief valve 37 is increased, so that the relief valve 37 is brought into a substantially closed state, and the relief pressure of the relief valve 40 is reduced, so that the relief valve 40 is brought into a substantially opened state. As a result, the oil discharged from the hydraulic pump 20 is passed through the check valve 38, the relief valve 40 and the check valve 39 back to the hydraulic pump 20. At this time, the hydraulic motor 24 forcedly rotated by a difference in load between the left and right wheels $W_L$ and $W_R$ is in the discharging direction shown by the dashed line, but the oil discharged from the hydraulic motor 24 is blocked by the check valve 35 and the check valve 38, and the hydraulic motor 24 is locked into a non-rotatable state, thereby realizing a differential-locked state.

When a normal differential mode is selected, both of the relieving pressures of the relief valves 37 and 40 are reduced, so that the relief valves 37 and 40 are brought into their substantially opened states. As a result, if a discharging direction of the hydraulic pump 20 is as shown by the solid line, the oil discharged from the hydraulic pump 20 is passed through the check valve 35, the relief valve 37 and the check valve 36 back to the hydraulic pump 20. At this time, the oil discharged in the direction shown by the solid line from the hydraulic motor 24 forcedly rotated by the difference in load between the left and right wheels $W_L$ and $W_R$ is passed through the relief valve 40, the check valve 39 and the check valve 35 back to the hydraulic pump 20 and hence, the hydraulic motor 24 is brought into a rotatable state in which it can be freely rotated with no load, thereby realizing the normal differential mode.

On the other hand, if a discharging direction of the hydraulic pump 20 is as shown by the dashed line, the oil discharged from the hydraulic pump 20 is passed through the check valve 38, the relief valve 40 and the check valve 39 back to the hydraulic pump 20. At this time, the oil discharged in the direction shown by the dashed line from the hydraulic motor 24 forcedly rotated by the difference in load between the left and right wheels $W_L$ and $W_R$ is passed through the relief valve 40, the check valve 39 and the check valve 35 back to the hydraulic pump 20 and hence, the hydraulic motor 24 is brought into the rotatable state in which it can be freely rotated with no load, thereby realizing the normal differential mode.

As described above, in the torque distributing mode applied during the normal traveling of the vehicle, the amount of torque distributed to the left and right wheels $W_L$ and $W_R$ is feed-forward controlled in accordance with the traveling condition of the vehicle, i.e., on the basis of outputs from the engine revolution-number sensor 55, the engine torque sensor 56, the steering angle sensor 57 and the vehicle speed sensor 59. Therefore, the amount of torque distributed can be adjusted without a time lag to generate a desired actual yaw rate. In addition, the amount of torque distributed to the left and right wheels $W_L$ and $W_R$ is feed-back controlled by comparing the actual yaw rate and the target yaw rate, and therefore, even when the actual yaw rate is deviated from the target yaw rate, it can be converged into the target yaw rate with a high accuracy.

In this way, the responsiveness and convergeability of the control can be reconciled by a combination of the feed-forward control and the feed-back control, and moreover, a desired control characteristic can be provided by changing the specific weights of the feed-forward control and the feed-back control.

Figure 9:
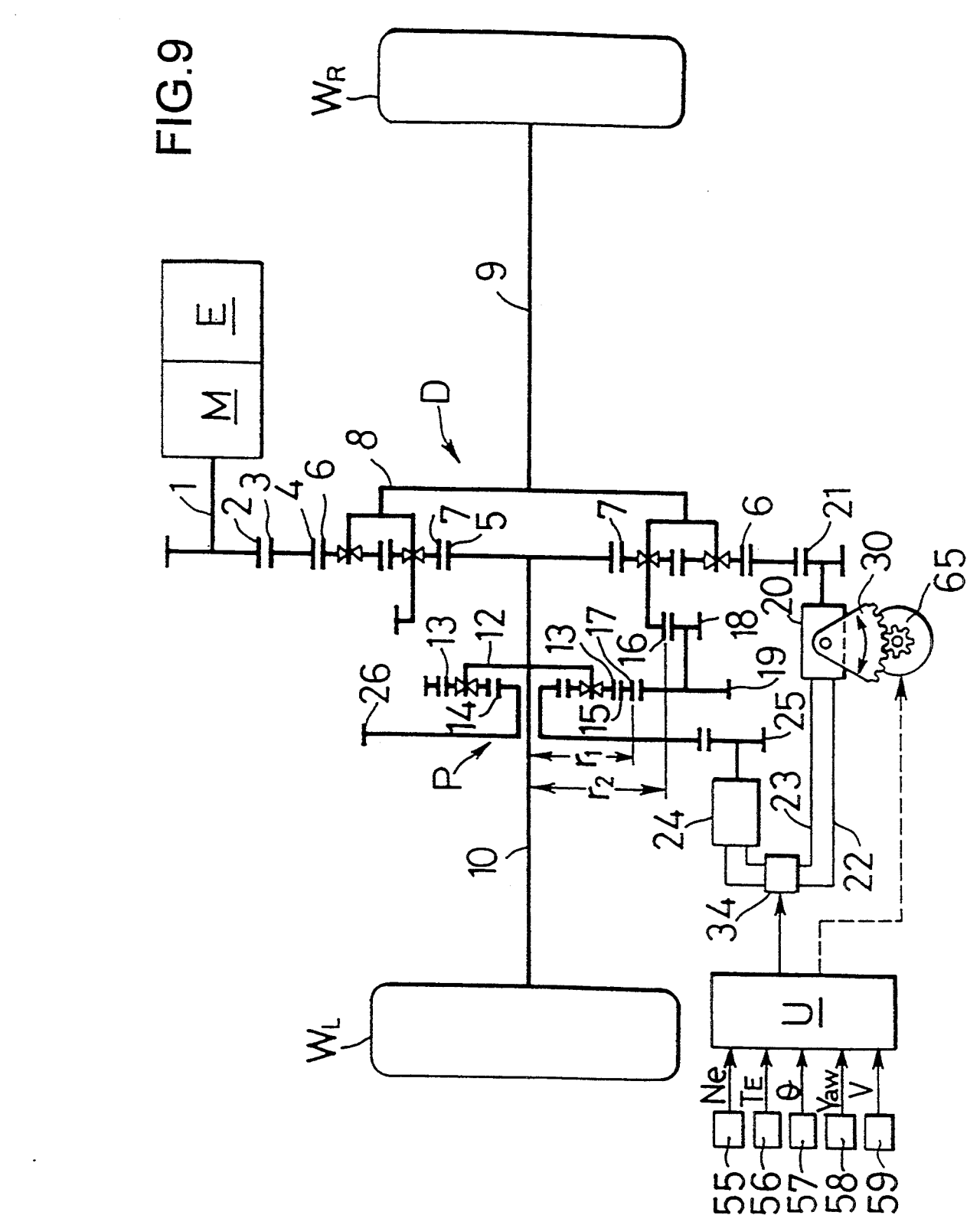

A second embodiment of the present invention will now be described in connection with FIGS. 9 and 10.

In the second embodiment, a displacement adjusting lever 30 for driving a swash plate of a hydraulic pump 2 is connected to an electric motor 65 which is connected to and driven by an electronic control unit U.

Figure 10:
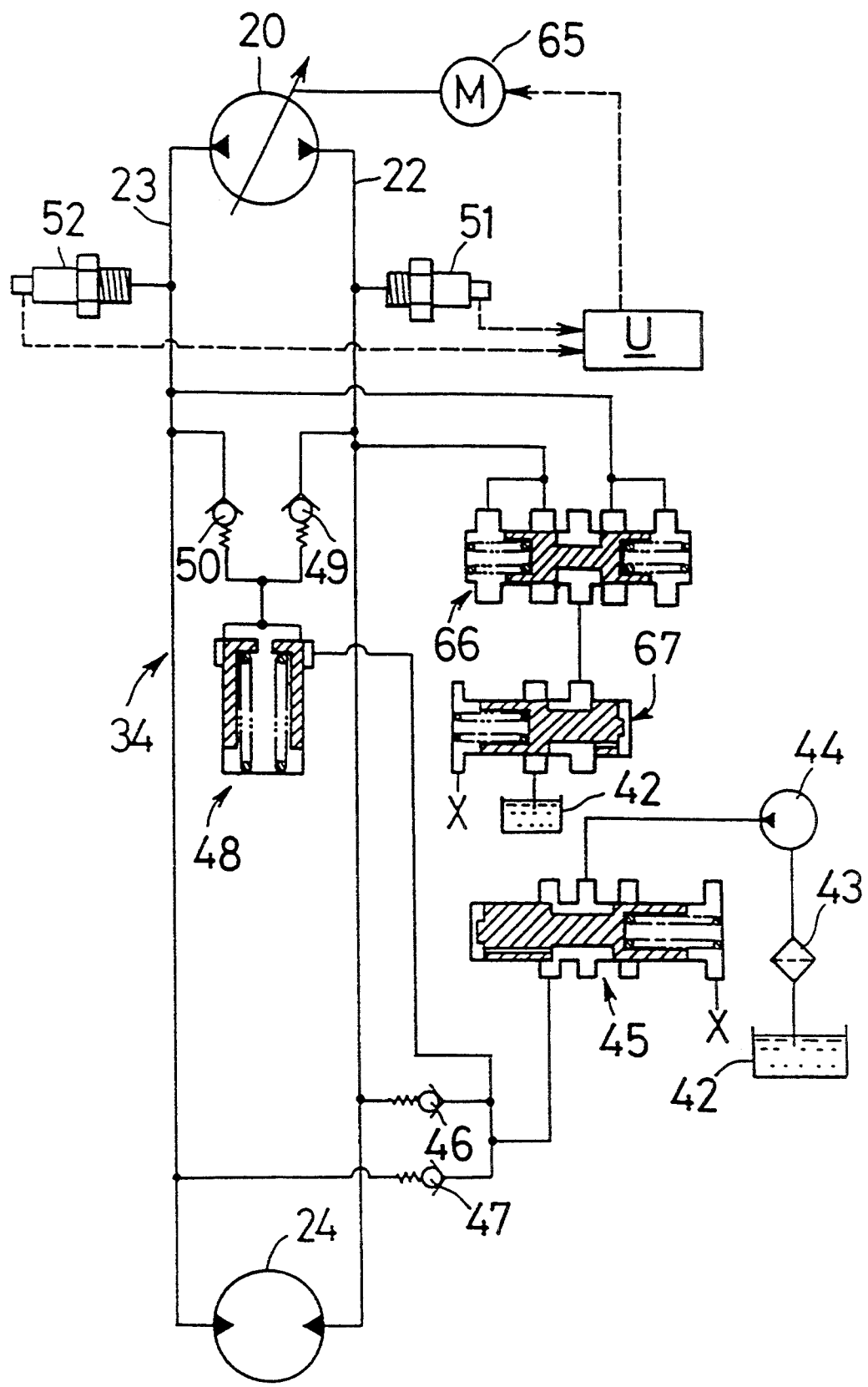

The amount of oil discharged from the hydraulic pump 20 is controlled by the electric motor 65 and hence, the relief valves 37 and 40 and the check valves 35, 36, 38 and 39 shown in FIG. 2 are omitted, reference characters 66 and 67 in FIG. 10 are a shuttle valve and a relief valve for permitting an oil having a relatively high temperature and discharged from the hydraulic motor 24 into a lower pressure oil passage 22 or 23 to be escaped to an oil tank 42.

In the second embodiment, the swash plate of the hydraulic pump 20 is controlled by the electric motor 65 connected to the electronic control unit U, so that the hydraulic pump 20 delivers a final distribution torque T determined in the final distribution torque determining means M13 shown in FIG. 3. At this time, the use of a feed-back control and a feed-forward control in combination ensures that an appropriate distribution of torque to the left and right wheels $W_L$ and $W_R$ can be carried out while insuring a satisfactory responsiveness and convergeability, thereby accurately conforming the actual turning state of the vehicle with a turning state desired by a driver.

A third embodiment of the present invention will now be described in connection with FIGS. 11 to 14.

Figure 11:
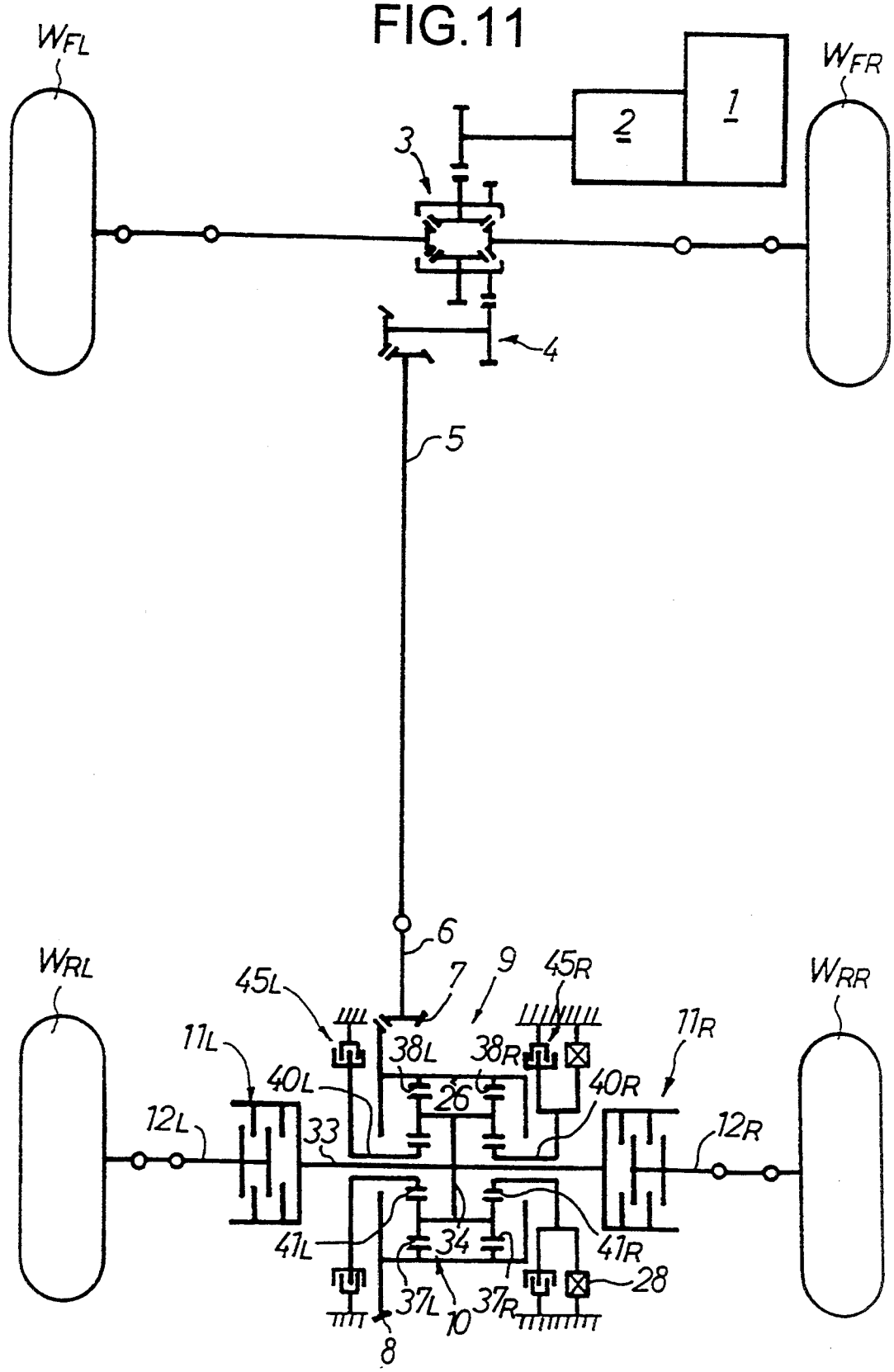

A torque distribution control apparatus of the third embodiment is applied to a 4-wheel drive vehicle. As shown in FIG. 11, and engine 1 and a transmission M are mounted in a front portion of a vehicle body, and a front differential 3 for distributing a torque to left and right driving wheels $W_{FL}$ and $W_{FR}$ is connected to an output shaft of the transmission 2. The front differential 3 is connected through a turning gear mechanism 4 to a propeller shaft 5 extending longitudinally of the vehicle body, and an input shaft 6 connected to a rear end of the propeller shaft 5 through a joint is connected through a pair of bevel gears 7 and 8 to a rear differential 9. The rear differential 9 includes a planetary gear type transmission mechanism 10 and a pair of left and right variable displacement type main hydraulic clutch $11_L$ and $11_R$ therein and distributes a torque to output shafts $12_L$ and $12_R$ of left and right rear driving wheels $W_{RL}$ and $W_{RR}$.

The planetary gear type transmission mechanism 10 includes a drum-like gear case 26 to which the bevel gear 8 is secured. A planetary gear carrier 34 is spline-coupled to a central portion of a transmitting shaft 33 extending laterally through the inside of the gear case 26, so that it is located within the gear case 26. Planetary gears $37_L$ --- and $37_R$ --- are rotatably carried respectively on left and right ends of a planetary gear shafts which are disposed at regular distances around an outer periphery of the planetary gear carrier 34. The left planetary gears $37_L$ --- are meshed with a ring gear $38_L$ formed on an inner periphery of the gear case 26, and with a sun gear $41_L$ integrally formed on a sleeve $40_L$ which is relatively rotatably carried on an outer periphery of the transmitting shaft 33. On the other hand, the right planetary gear $37_R$ are meshed with a ring gear $38_R$ formed on the inner periphery of the gear case 26, and with a sun gear $41_R$ integrally formed on a sleeve $40_R$ which is relatively rotatably carried on the outer periphery of the transmitting shaft 33.

The left sleeve $40_L$ relatively rotatably carried on the transmitting shaft 33 and having the sun gear $41_L$ integrally formed thereon is coupled to a casing through an arresting clutch $45_L$. The right sleeve $40_R$ relatively rotatably carried on the transmitting shaft 33 and having the sun gear $41_R$ integrally formed thereon is coupled to a right casing 16 through an arresting clutch $45_R$, and a one-way clutch 28 is provided between the right sleeve $40_R$ and the casing.

Thus, if the sun gear $41_L$ is fixed through the sleeve $40_L$ by turning ON the left arresting clutch $45_L$ (i.e., bringing it into an engaged state), a torque applied to the gear case 26 of the planetary gear type transmission mechanism 10 is transmitted from the planetary gears $37_L$ --- meshed with the left ring gear $38_L$ and the sun gear $41_L$ through the planetary gear carrier 34 carrying the planetary gears $37_L$ --- to the transmitting shaft 33. In this case, the planetary gear type transmission mechanism 10 reduces the number of revolutions of the gear case 26 to transmit it to the transmitting shaft 33.

On the other hand, if the sun gear $41_R$ is fixed through the sleeve $40_R$ by turning ON the right arresting clutch $45_R$, a torque applied to the gear case 26 of the planetary gear type transmission mechanism 10 is transmitted from the planetary gears $37_R$--- meshed with the right ring gear $38_R$ and the sun gear $41_R$ through the planetary gear carrier 34 to the transmitting shaft 33. In this case, the planetary gear type transmission mechanism 10 reduces the number of revolutions of the gear case 26 at a reduction ratio larger than that when the left arresting clutch $45_L$ is turned ON, to transmit it to the transmitting shaft 33.

The right sleeve $40_R$ is fixed to the right casing when the arresting clutch $45_R$ is turned ON, but otherwise, is fixed to the casing by the one-way clutch 28 in accordance with the operational condition of the vehicle. More specifically, when the torque of the engine 1 is being transmitted to the rear driving wheels $W_{RL}$ and $W_{RR}$, the right sleeve $40_R$ is fixed to the casing by turning ON the one-way clutch 28. Reversely, when the torque of front driving wheels $W_{FL}$ and $W_{FR}$ is being transmitted to the engine 1, the sleeve $40_R$ is brought into its freely rotatable state by turning the one-way clutch OFF (releasing the engagement).

The rotation of the transmitting shaft 33 is transmitted through the pair of main left and right hydraulic clutches $11_L$ and $11_R$ to the corresponding output shafts $12_L$ and $12_R$. In this case, the magnitudes of the torques transmitted from the transmitting shaft 33 to the left and right output shafts $12_L$ and $12_R$ can be independently adjusted by controlling the magnitudes of the hydraulic pressures applied to the main hydraulic clutches $11_L$ and $11_R$, respectively.

A hydraulic pressure control system for the main hydraulic clutches $11_L$ and $11_R$ and the arresting clutches $45_L$ and $45_R$ will be described below in detail.

A hydraulic pressure circuit shown in FIG. 12 includes a hydraulic pump 74, an unloading valve 75, a fail-safe valve 76, three pressure control valves 77, $78_L$ and $78_R$ and a shift valve 79, so that a pressure oil discharged by the hydraulic pump 74 is passed through the unloading valve 75 and the fail-safe valve 76; controlled by the pressure control valves $78_L$ and $78_R$ and passed to the left and main hydraulic clutches $11_L$ and $11_R$, and likewise, controlled by the pressure control valve 77 and supplied alternatively to the left and right arresting clutches $45_L$ and $45_R$ by the shift valve 79.

The hydraulic pump 74 comprise a well-known vane pump or the like, and is driven directly by a crank shaft of the engine, or by a motor or the like to pressurize the oil in a reservoir tank 80 and discharge it. The unloading valve 75 is responsive to the discharged pressure from the hydraulic pump 74, and permits the oil to be returned to the reservoir tank, when the discharged pressure from the hydraulic pump 74 exceeds a predetermined pressure. The fail-safe valve 76 includes a spool 82 accommodated within a housing 81 which is provided with an inlet portion communicating with the unloading valve 75, a drain port communicating with the reservoir tank 80, and an outlet port communicating parallel with the pressure control valves 77, $78_L$ and $78_R$, a return spring 83 provided at one side of the housing 81 for biasing the spool 82 in one direction, and a solenoid 84 provided at the other side of the housing 81 for biasing the spool 82 against a resilient force of the return spring 83. In this fail-safe valve 76, the inlet port communicating with the unloading valve 75 is put out of communication with the outlet port communicating with the pressure control valves 77, $78_L$ and $78_R$ and put into communication with the drain port communicating with the reservoir tank 80, upon an abnormal condition such as a trouble.

Reference character 85 is a well-known accumulator. If the accumulator is sufficiently pressure-accumulated, so that the discharged pressure from the hydraulic pump 74 is increased to exceed a predetermined value, the unloading valve 75 is opened to permit the discharged oil from the hydraulic pump 74 to be returned to the reservoir tank 80.

The pressure control valve 77 includes a spool 87 slidably received in an accommodating hole provided in the housing 86, a return spring 88 mounted under compression at one side of the housing 86 for biasing the spool 87 in one direction, and a solenoid 89 provided at the other side of the housing 86 for biasing the spool 87 against a resilient force of the return spring 88. The housing 86 is provided with an inlet port 90 communicating with the fail-safe valve 76, an outlet port 91 communicating with the shift valve 79, a drain port 92 communicating with the reservoir tank 80, a first control port 93a communicating with the outlet port 91, and a second control port 93b communicating with the outlet port 91 through a restriction 94. The spool 87 is provided with a streak groove $87_1$ and a shallow groove $87_2$ defining a slight clearance between the groove $87_2$ itself and a peripheral wall surface of the accommodating hole. A variable restriction 95a is defined between the inlet port 90 and the outlet port 91 by the spool 87 and the streak groove $87_1$, and a variable restriction 95b is defined between each of the control ports 93a and 93b and the drain port 92 by the spool 87 and the shallow groove $87_2$.

In the pressure control valve 77, and the spool 87 is biased by a biasing force corresponding to an electric current value applied from the electronic control unit U, and the displacement of the spool 87 by a biasing force of the solenoid 89 causes the resistances of the variable restrictions 95a and 95b to be varied in a reverse characteristics, thereby controlling the hydraulic pressure delivered from the outlet port 91.

The energization of the solenoid 89 in the pressure control valve 77 is synchronous with the shifting of the shift valve 79, and the pressure control valve 77 is controlled to reduce the hydraulic pressure delivered from the outlet port 91 upon the shifting of the shift valve 79, as will be described hereinafter.

The shift valve 79 includes a spool 97 slidably received within a housing 96, a return spring 98 mounted under compression at one side of the housing 96 for biasing the spool 97 in one direction, and a solenoid 99 mounted at the other side of the housing 96 for biasing the spool 97 against a resilient force of the return spring 98. The housing 96 is provided with an inlet port 100 communicating with the pressure control valve 77, an outlet port 101a communicating with the left arresting clutch $45_L$, an outlet port 101b communicating with the right arresting clutch $45_R$, and two drain ports 102a and 102b communicating with the reservoir tank 80. The spool 97 is provided with streak grooves $97_1$, $97_2$ and 97-3 which permit the outlet ports 101a and 101b to be selectively put into communication with the inlet port 100 or the drain ports 102a and 102b, respectively.

The solenoid 99 is connected to the electronic control unit U and energized from the electronic control unit U to bias the spool 97. The shift valve 79 permits the inlet port 100 and the outlet port 101a, as well as the drain port 102a and the outlet port 101b to be put into communication with each other during non-energization (a state shown in FIG. 12) of the solenoid 99 to introduce a hydraulic pressure to the left arresting clutch $45_L$, and permits the inlet port 100 and the outlet port 101b as well as the drain port 102b and the outlet port 101a to be put into communication with each other during energization of the solenoid 99 to introduce the hydraulic pressure to the right arresting clutch $45_R$.

The pressure control valves $78_L$ and $78_R$ have the same construction as the pressure control valve 77. In the pressure control valve $78_L$, an outlet port 91 is put into communication with the left main hydraulic clutch $11_L$ to control the hydraulic pressure supplied to the main hydraulic clutch $11_L$ in accordance with an electric current value applied from the electronic control unit U to the solenoid 89. Likewise, in the pressure control valve $78_R$, an outlet port 91 is put into communication with the right main hydraulic clutch $11_R$ to supply the hydraulic pressure. Portions of the pressure control valves $78_L$ and $78_R$ corresponding to those of the pressure control valve 77 are designated by the same reference characters, and the description of them is omitted.

As shown in FIG. 13, supplied to the electronic control unit U are signals from an engine revolution-number sensor 51 for detecting a number Ne of revolutions of the engine 1, an engine torque sensor 52 for detecting a torque $T_E$ of the engine 1, a steering angle sensor 53 for detecting a steering angle $\theta$, a vehicle speed sensor 54 for detecting a vehicle speed V, and an actual yaw rate sensor for detecting an actual yaw rate Yaw. The electronic control unit U calculates the signal from each of the sensors 51 to 55 according to a predetermined program to control the fail-safe valve 76, the pressure control valve 77, the pressure control valve $78_L$, the pressure control valve $78_R$ and the shift valve 79.

FIG. 14 illustrates a control circuit provided in the electronic control unit U to control the pressure control valves $78_L$ and $78_R$ connected to the left and right main hydraulic clutches $11_L$ and $11_R$. The control circuit in the third embodiment includes ten means M1 to M11'. Eight of these means M1 to M11', i.e., the drive shaft torque calculating means M1, the gear ratio calculating means $M_2$, the lateral distribution correcting factor calculating means M4, the lateral distribution correcting factor calculating means M5, the target yaw rate calculating means M6, the lateral acceleration calculating means M7, the reference yaw rate calculating means M8 and the yaw rate deviation calculating means M9 have the same functions as those in the first embodiment shown in FIG. 3. The left and right rear wheel torque calculating means M3' and the feed-back torque calculating means M11' in the third embodiment correspond to the left and right rear wheel torque calculating means M3 and the feed-back torque calculating means M11 in the first embodiment and have functions different from those in the first embodiment.

More specifically, in the feed-back torque calculating means M11', a feed-back factor $k_F(=\Delta Y \times C)$ is determined by multiplying a yaw rate deviation $\Delta Y$ by a constant C. In the left and right rear wheel torque calculating means M3', a torque $T_{RL}$ to be distributed to the left rear driving wheel $W_{RL}$ and a torque $T_{RR}$ to be distributed to the right rear driving wheel $W_{RR}$ are calculated according to a following expressions (3) and (4) using a drive shaft torque $T_D$ calculated in the drive shaft torque calculating means M1, lateral distribution correcting factors $K_T$ and $K_V$ calculated in the lateral distribution correcting factor calculating means M4, lateral distribution correcting factors G and $K_V$ calculated in the lateral distribution correcting factor calculating means M5, a feed-back factor $k_F$ calculated in the feed-back torque calculating means M11' and a constant $K_W$.

$$T_{RL} = \tfrac{1}{2} T_D \times (1-k_F) \times (1+K_W \times K_T \times K_Y \times G) \quad (3)$$

$$T_{RR} = \tfrac{1}{2} T_D \times (1-k_F) \times (1-K_W \times K_T \times K_Y \times G) \quad (4)$$

As can be seen from the expressions (3) and (4), the feed-back factor $k_F$ ($0 \leq k_F \leq 1$) determines a longitudinal torque distribution ratio between the front driving wheels $W_{FL}$ and $W_{FR}$ and the rear driving wheels $W_{RL}$ and $W_{RR}$. If $1 < k_F < 1$, then a torque equal to $T_D \times k_F$ is distributed to the front driving wheels $W_{FL}$ and $W_{FR}$, and a torque equal to $T_D \times (1-k_F)$ is distributed to the rear driving wheels $W_{RL}$ and $W_{RR}$. If $k_F = 0$, then all the drive shaft torque $T_D$ is distributed to the rear driving wheels $W_{RL}$ and $W_{RR}$. Further, if $k_F = 1$, then all the drive shaft torque $T_D$ is distributed to the front driving wheels $W_{FL}$ and $W_{FR}$.

The third term $(1 \pm K_W \times K_T \times K_Y \times G)$ in a right sides of the expressions (3) and (4) determine a lateral torque distribution ratio between the left and right rear driving wheels $W_{RL}$ and $W_{RR}$. If the distribution of the torque to one of the rear driving wheels $W_{RL}$ and $W_{RR}$ is increased by a predetermined amount, the distribution of the torque to the other of the rear driving wheels $W_{RL}$ and $W_{RR}$ is decreased by the predetermined amount.

When the torques $T_{RL}$ and $T_{RR}$ to be distributed to the left and right rear driving wheels $W_{RL}$ and $W_{RR}$ are determined in the above manner, the pressure control valves $78_L$ and $78_R$ for the pair of left and right main hydraulic clutches $11_L$ and $11_R$ are controlled, so that such torques $T_{RL}$ and $T_{RR}$ are transmitted to the left and right rear driving wheels $W_{RL}$ and $W_{RR}$.

The operation of the third embodiment having the above arrangement will be described below.

In a 4-wheel drive vehicle having the above-described rear differential 9, the pressure control valve $78_L$ for the main hydraulic clutch $11_L$ is controlled, so that the torque $T_{RL}$ determined according to the expression (3) is distributed to the left rear driving wheel $W_{RL}$, and the pressure control valve $78_R$ for the main hydraulic clutch $11_R$ is controlled, so that the torque $T_{RR}$ determined according to the expression (4) is distributed to the right rear driving wheel $W_{RR}$, both by a command from the electronic control unit U.

During this time, the longitudinal torque distribution ratio between the front driving wheels $W_{FL}$ and $W_{FR}$ and the rear driving wheels $W_{RL}$ and $W_{RR}$ is adjusted on the basis of the feed-back factor $k_F$ determined in the feed-back torque calculating means M11'. Specifically, if the yaw rate deviation $\Delta Y$ is positive, and an over-steering tendency is produced, the feed-back factor $k_F$ is increased, so that the amount of torque distributed to the front driving wheels $W_{FL}$ and $W_{FR}$ is increased. On the other hand, if the yaw rate deviation $\Delta Y$ is negative, and under-steering tendency is produced, the feed-back factor $k_F$ is decreased, so that the amount of torque distributed to the rear driving wheels $W_{RL}$ and $W_{RR}$ is increased. This causes the actual yaw rate of the vehicle to be feed-back controlled, so that it is matched with a target yaw rate desired by the driver.

In addition, the lateral torque distribution ratio between the left and right rear driving wheels $W_{RL}$ and $W_{RR}$ is feed-forward controlled on the basis of the lateral distribution correcting factors $K_T$, $K_Y$ and G determined in the lateral distribution correcting factor calculating means M4 and M-5. As a result, when the actual yaw rate is increased, a larger amount of torque is distributed to the rear driving wheels $W_{RL}$ and $W_{RR}$ which are outer wheels during turning of the vehicle, and when the actual yaw rate is decreased, a larger amount of torque is distributed to the rear driving wheels $W_{RL}$ and $W_{RR}$ which are inner wheels during turning of the vehicle. This provides a turning state desired by the driver and enhances the motional performance of the vehicle.

By conducting the feed-back control of the longitudinal torque distribution ratio and the feed-forward control of the lateral torque distribution ratio in the above manner, the torque is distributed laterally at an initial stage of the control by the feed-forward control excellent in responsiveness to promptly vary the yaw rate of the vehicle. When the variation of the yaw rate is begun, the longitudinal torque distribution ratio can be feed-back controlled on the basis of a deviation between the actual yaw rate and the target yaw rate, and the actual yaw rate can be properly matched with the target yaw rate with a high accuracy. In this way, it is possible to reconcile the responsiveness and convergeability of the control and to provide an excellent steering characteristic by a combination of the feed-forward control and the feed-back control.

On the other hand, in this vehicle, if the left sun gear $41_L$ of the planetary gear type transmission mechanism 10 is fixed, the power transmitted to the rear driving wheels $W_{RL}$ and $W_{RR}$ is increased in speed. If the right sun gear $41_R$ is fixed, the rear driving wheels $W_{RL}$ and $W_{RR}$ and the front driving wheels $W_{FL}$ and $W_{FR}$ are connected to each other at a transmission gear ratio of about 1 as described above. The left sun gear $41_L$ is fixed, when the arresting clutch $45_L$ has been turned ON, and the right sun gear $41_R$ is fixed by the one-way clutch 28, when the power is being transmitted to the rear driving wheels $W_{RL}$ and $W_{RR}$, and regardless of whether or not the power is transmitted to the rear driving wheels $W_{RL}$ and $W_{RR}$, the right sun gear $41_R$ is fixed, when the arresting clutch $45_R$ has been turned ON.

The hydraulic pressure adjusted by the pressure control valve 77 is alternatively and selectively introduced through shifting of the shift valve 79 into cylinders $14_1$ and $13_1$ of the arresting clutches $45_L$ and $45_R$, but the pressure control valve 77 and the shift valve 79 are controlled in accordance with the operational condition of the vehicle such as braking, turning or the like, and further, during shifting of the shift valve 79, the pressure control 77 is controlled, so that the hydraulic pressure supplied to the shift valve 79 is decreased. More specifically, for example, during turning or the like of the vehicle, the shift valve 79 permits the left arresting clutch $45_L$ to be turned ON to increase of the speed of the rear driving wheels $W_{RL}$ and $W_{RR}$. During backward traveling of the vehicle or during braking of the vehicle by an engine brake, the shift valve 79 permits the right arresting clutch $45_R$ to turned ON to connect the rear driving wheels $W_{RL}$ and $W_{RR}$ directly to the front driving wheels $W_{FL}$ and $W_{FR}$. Further, during a normal straight traveling of the vehicle in which the power id transmitted from the engine 1 to the rear driving wheels $W_{RL}$ and $W_{RR}$, the shift valve 79 permits both of the arresting clutches $45_L$ and $45_R$ to be put into communication with the reservoir tank 80, thereby arresting the sun gear $41_R$ by the one-way clutch 28 and connecting the rear driving wheels $W_{RL}$ and $W_{RR}$ directly to the front driving wheels $W_{FL}$ and $W_{FR}$. During braking of the vehicle by a foot brake, the pressure control valve 77 permits the hydraulic pressure to be returned to the reservoir tank 80 to turn OFF the arresting clutches $45_L$ and $45_R$, and temporarily reduces the hydraulic pressure supplied to the shift valve 79 synchronously with the shifting of the shift valve 79. Thus, during turning of the vehicle, it is possible to increase the speed of power transmitted to the rear driving wheels $W_{RL}$ and $W_{RR}$ without detraction of the straight advance stability to provide a high turning performance, and during braking of the vehicle by a foot brake, it is possible to disconnect the front driving wheels $W_{FL}$ and $W_{FR}$ and the rear driving wheels $W_{RL}$ and $W_{RR}$ from each other to prevent a variation in distribution of a braking force between the front driving wheels $W_{FL}$ and $W_{FR}$ and the rear driving wheels $W_{RL}$ and $W_{RR}$. Further, during braking of the vehicle by an engine brake, it is possible to provide a large braking effect and further to reduce the shifting shock.

Although the embodiments of the present invention have been described in detail, it will be understood that the present invention is not limited to these embodiments, and various modifications in design may be made without departing from the spirit and scope of the invention defined in claims.

For example, the construction for longitudinally and laterally distributing the torque is not limited to those in the embodiments and can be replaced by any of various known constructions. In addition, not only the torque distributed to the rear driving wheels, but also the torque distributed to the front driving wheels can be further distributed laterally.

What is claimed is:

1. A torque distribution control apparatus for a vehicle for controlling the torque distribution to distribute the torque of an engine to left and right driving wheels at a predetermined torque distribution ratio, comprising
    a travel condition detecting means for detecting the travel condition of the vehicle,
    an attitude change amount detecting means for detecting the change amount of attitude of the vehicle,
    a control means for feed-forward controlling the torque distribution ratio on the basis of an output from said travel condition detecting means, and for feed-back controlling the torque distribution ratio, such that an actual attitude change amount determined on the basis of an output from said attitude change amount detecting means is matched with a target attitude change amount determined on the basis of the output from said travel condition detecting means, and
    an actuator for carrying out the torque distribution on the basis of an output from said control means.

2. A torque distribution control apparatus for a vehicle for controlling the torque distribution to distribute the torque of an engine to front driving wheels and rear driving wheels at a predetermined longitudinal torque distribution ratio, and controlling the torque distribution to distribute at least one of the torque distributed to the front driving wheels and the torque distributed to the rear driving wheels to the left driving wheels and the right driving wheels at a predetermined lateral torque distribution ratio, comprising
    a travel condition detecting means for detecting the travel condition of the vehicle,
    an attitude change amount detecting means for detecting the change amount of attitude of the vehicle,
    a control means for feed-forward controlling the lateral torque distribution ratio on the basis of an output from said travel condition detecting means, and feed-back controlling the longitudinal torque distribution ratio, such that an actual attitude change amount determined on the basis of an output from said attitude change amount detecting means is matched with a target attitude change amount determined on the basis of the output from said travel condition detecting means, and
    an actuator for carrying out the torque distribution on the basis of an output from said control means.

3. A torque distribution control apparatus for a vehicle according to claim 1 or 2, wherein said travel condition detecting means comprises an engine torque sensor for detecting a torque of the engine, a vehicle speed sensor for detecting a vehicle speed, and a steering angle sensor for detecting a steering angle, and said attitude change amount detecting means comprises a yaw rate sensor for detecting a yaw rate.

* * * * *